(12) United States Patent
Nakamura et al.

(10) Patent No.: US 6,971,106 B1
(45) Date of Patent: Nov. 29, 2005

(54) SYSTEM FOR TRANSFERRING DATA BETWEEN APPLICATION SYSTEMS

(75) Inventors: Yoshiyuki Nakamura, Kanagawa (JP); Hiroyuki Yasuda, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/430,124

(22) Filed: Oct. 29, 1999

(30) Foreign Application Priority Data

Nov. 2, 1998 (JP) .............................. P10-311812

(51) Int. Cl.[7] .............................................. G06F 9/00
(52) U.S. Cl. ...................... 719/310; 709/217; 709/238
(58) Field of Search ................. 709/310–319, 709/231, 232, 236, 237, 245, 238

(56) References Cited

U.S. PATENT DOCUMENTS

| | | | | |
|---|---|---|---|---|
| 5,329,619 A | * | 7/1994 | Page et al. ................... | 709/203 |
| 5,987,508 A | * | 11/1999 | Agraharam et al. ......... | 709/217 |
| 6,049,819 A | * | 4/2000 | Buckle et al. ............... | 709/202 |
| 6,052,711 A | * | 4/2000 | Gish ........................... | 709/203 |
| 6,347,342 B1 | * | 2/2002 | Marcos et al. ............... | 709/315 |
| 6,405,266 B1 | * | 6/2002 | Bass et al. ................... | 709/328 |
| 6,453,356 B1 | * | 9/2002 | Sheard et al. ............... | 709/231 |

OTHER PUBLICATIONS

Barrett, "Component Based Business Solutions under Architecture", White Paper, 1998, pp. 1-8.*
Frontec, "Frontec Annual Report 1997", 1997, Frontect AB, pp. 1-41.*
SEI System Engineering, Inc., "MQSeries Intergrator", Jun. 1999, pp. 1-28.*
Computergram International, "Big Name Investors Sign up to back Constellar's Hub", Jul. 1998, pp. 0-1.*

* cited by examiner

*Primary Examiner*—Meng-Al T. An
*Assistant Examiner*—Phuong N. Hoang
(74) *Attorney, Agent, or Firm*—Rader, Fishman & Grauer PLLC; Ronald P. Kananen

(57) ABSTRACT

A system for transferring data between application systems. The system comprises a mediating system centrally located among a plurality of application systems configured to function in an application operating environment. The mediating system supports data transfers between any two of the configured application systems.

4 Claims, 8 Drawing Sheets

SYSTEM FOR TRANSFERRING DATA BETWEEN APPLICATION SYSTEMS

BACKGROUND OF THE INVENTION

The present invention relates to a system for transferring data between application systems.

Illustratively, as shown in FIG. 8, in an environment where a plurality (n) of application systems (simply called systems hereunder where appropriate) are configured to operate, it may be desired to transfer data between any two of the configured systems. In that case, the number of connections through which the data flow known as the connection count is defined as nC2.

Therefore, the connection count is merely 3 when the number (n) of systems is 3, and 10 when n=5. When n= 10, however, the connection count amounts to 45 and when n=100, the connection count is as high as 4,950. That is, as the system count (n) increases, the connection count that must be recorded and managed by a system administrator grows on a massive scale.

However, such explosive leaps in the connection count necessarily involve raising the number of steps in which to manage recordings, changes and other settings for operating the systems properly and for transferring data correctly therebetween. In particular, where "n" systems are in operation and a given system is relocated, the settings of as many as (n−1) systems must be changed.

Thus the more complex the environment becomes for systems to operate in, the greater the costs for properly transferring data therebetween.

SUMMARY OF THE INVENTION

It is therefore an object of the present invention to overcome the above and other deficiencies of the prior art and to provide a novel system for transferring data between application systems.

In carrying out the invention and according to one aspect thereof, there is provided a system for transferring data between application systems, the system comprising a mediating system centrally located among a plurality (n) of application systems configured to function in an application operating environment, the mediating system supporting data transfers between the application systems.

With the inventive system in place, the connection count to be managed amounts to a mere "n."

Other objects, features and advantages of the invention will become more apparent upon a reading of the following description and appended drawings.

DETAILED DESCRIPTION OF THE PREFERRED EMBODIMENTS

Figure 1:
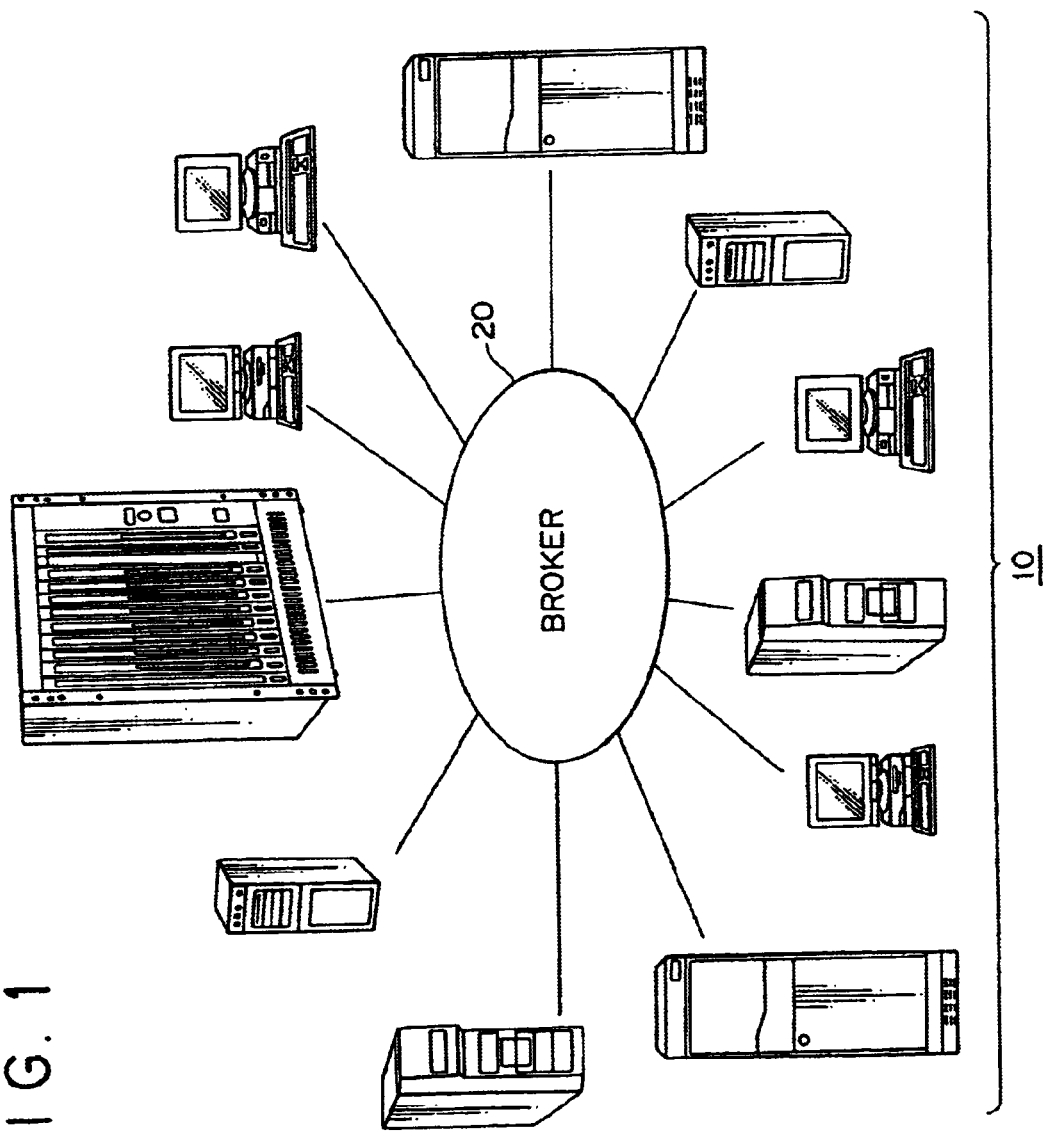
FIG. 1 is a schematic flow diagram of an embodiment of the present invention.

In FIG. 1, reference numeral 10 denotes an application system. These systems 10 are configured to set up a system operating environment. They may be of any type: old or new, large or small, ready-made or custom-made, as long as they are capable of transferring data therebetween. A system 20 for mediating data to be distributed is placed in this system operating environment. The system 20 is called the mediating system or the broker hereunder.

Figure 2:
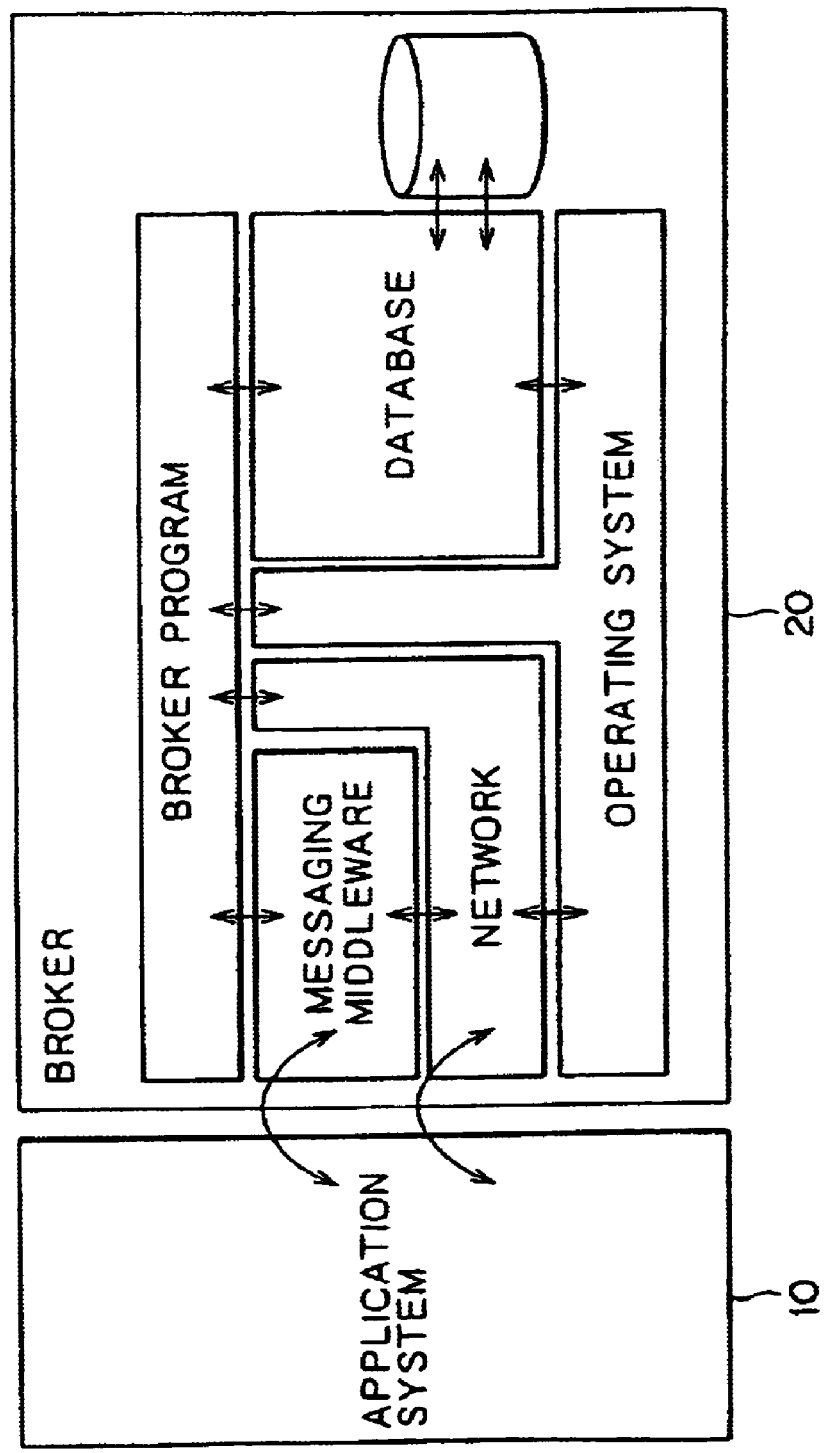
FIG. 2 is a schematic view for explaining the present invention.

Hardware in which to implement the broker 20 may be of any type as long as it supports necessary functions. Software for operating the broker 20 illustratively comprises such components as a broker program, an operating system, messaging middleware, networking middleware and a database as outlined in FIG. 2.

The operating system oversees the entire system processing. The network layer deals with communication services between programs as well as between systems, and controls communication hardware. The messaging middleware layer supports asynchronous communication of data in units of messages between programs as well as between systems. The database is provided to retain data in a manner permitting rapid search therethrough. More specifically, the database is provided to implement the function of determining data transfer destinations. Any of these components may be included in the broker 20 as part of its functionality.

Figure 3:
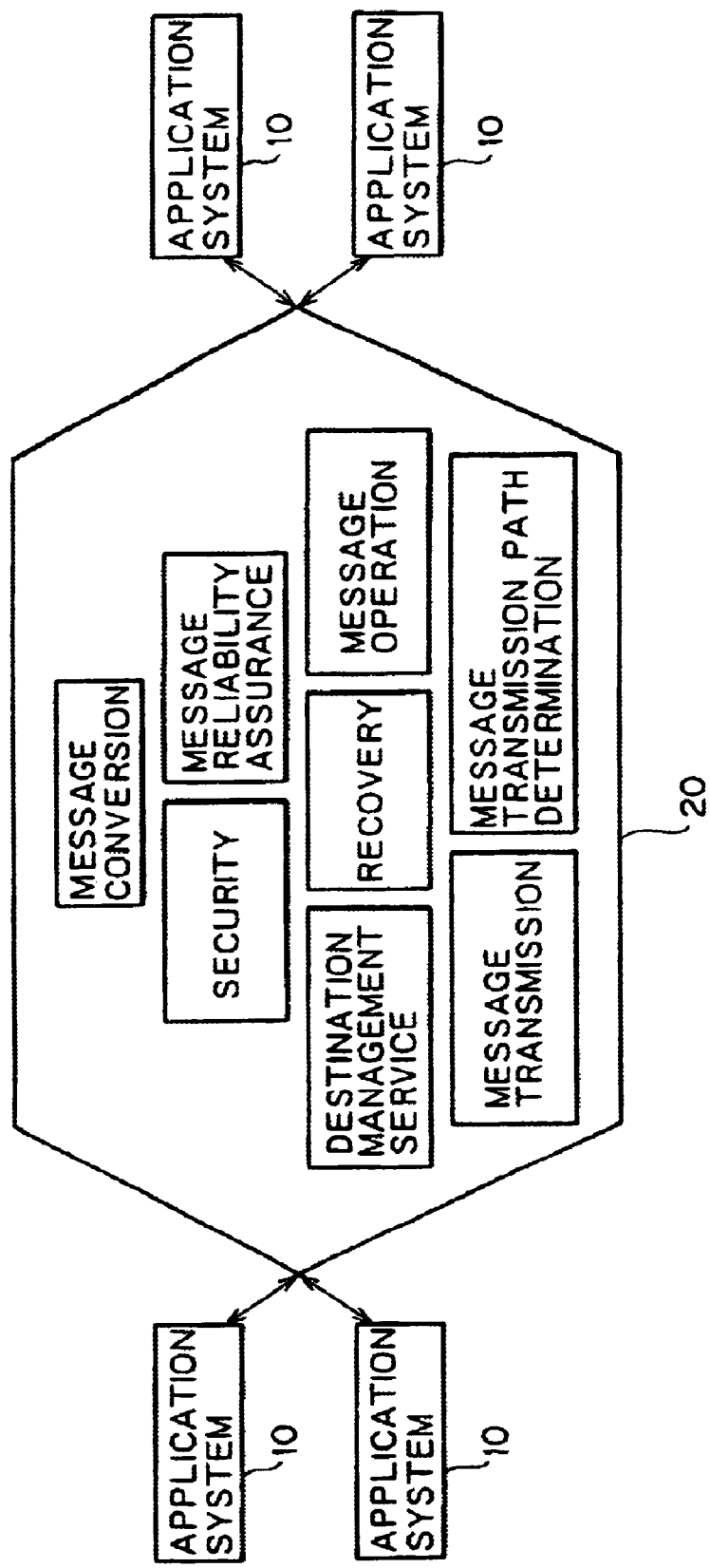
FIG. 3 is another schematic view for explaining the present invention.
Figure 4:
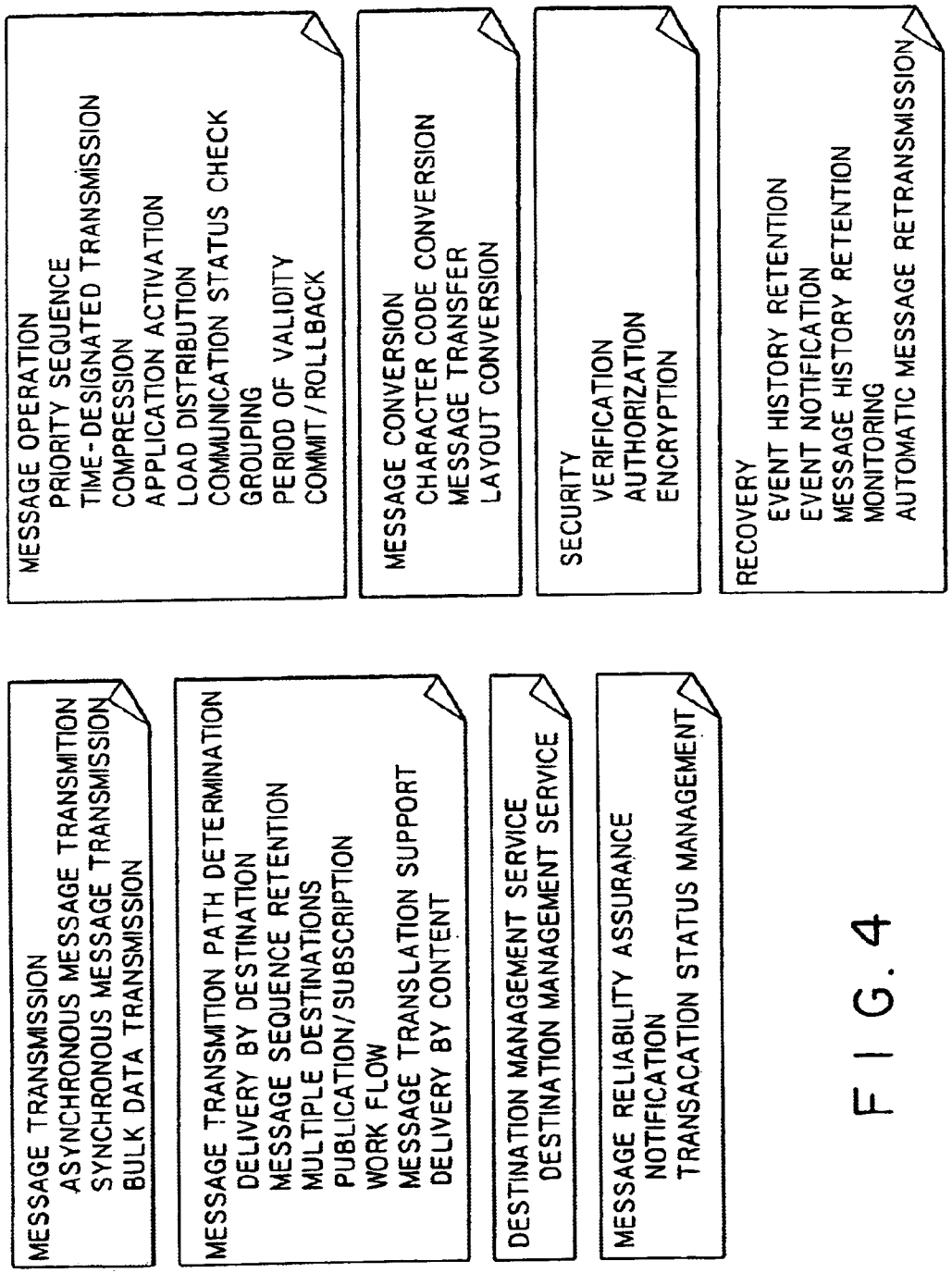
FIG. 4 is another schematic view for explaining the present invention.
Figure 5:
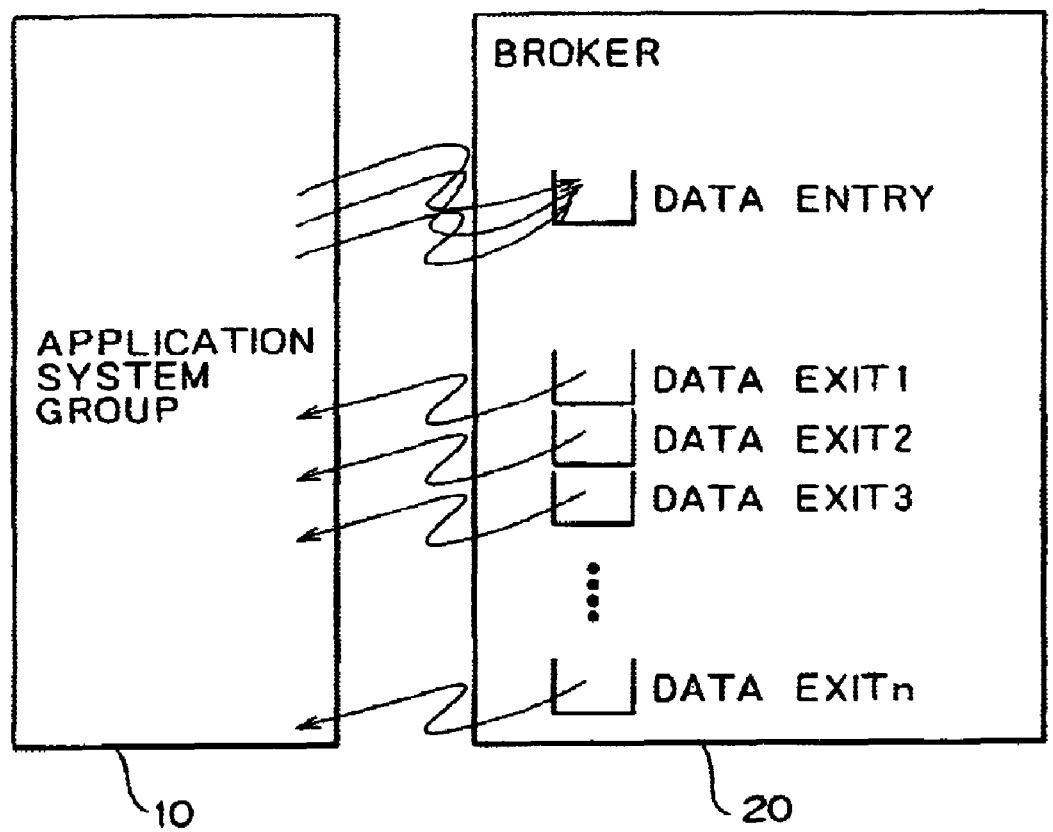
FIG. 5 is another schematic view for explaining the present invention.

As shown illustratively in FIG. 3, the broker 20 with its broker program implements eight function groups. These function groups comprise a total of, say, 33 functions as indicated tin FIG. 4.

Of the eight function groups, those most basic deal with data transmission and data transmission path determination. That is, the broker 20 always provides at least two function groups: a data transmission function group, and a data transmission path determination function group.

The transmission function group supports data transfers from the broker 20 to the systems 10 and from the systems 10 to the broker 20. The group also interfaces over a network any two systems operating in different architecture environments. The transmission function group utilizes messaging middleware.

The transmission path determination function group selects a system 10 to be connected to the broker 20 in accordance with a destination name attached to data, and transmits the data to the correct destination. Logical names are used to represent destination names so that any negative impact resulting from system changes is reduced.

Where the broker 20 mediates data between "n" systems 10, the broker 20 has at least one data entry and at least "n" data exits. The data exits correspond to the logical names of the systems 10 on a one-to-one basis, and a table holding such correspondences is retained in the database.

Figure 6:
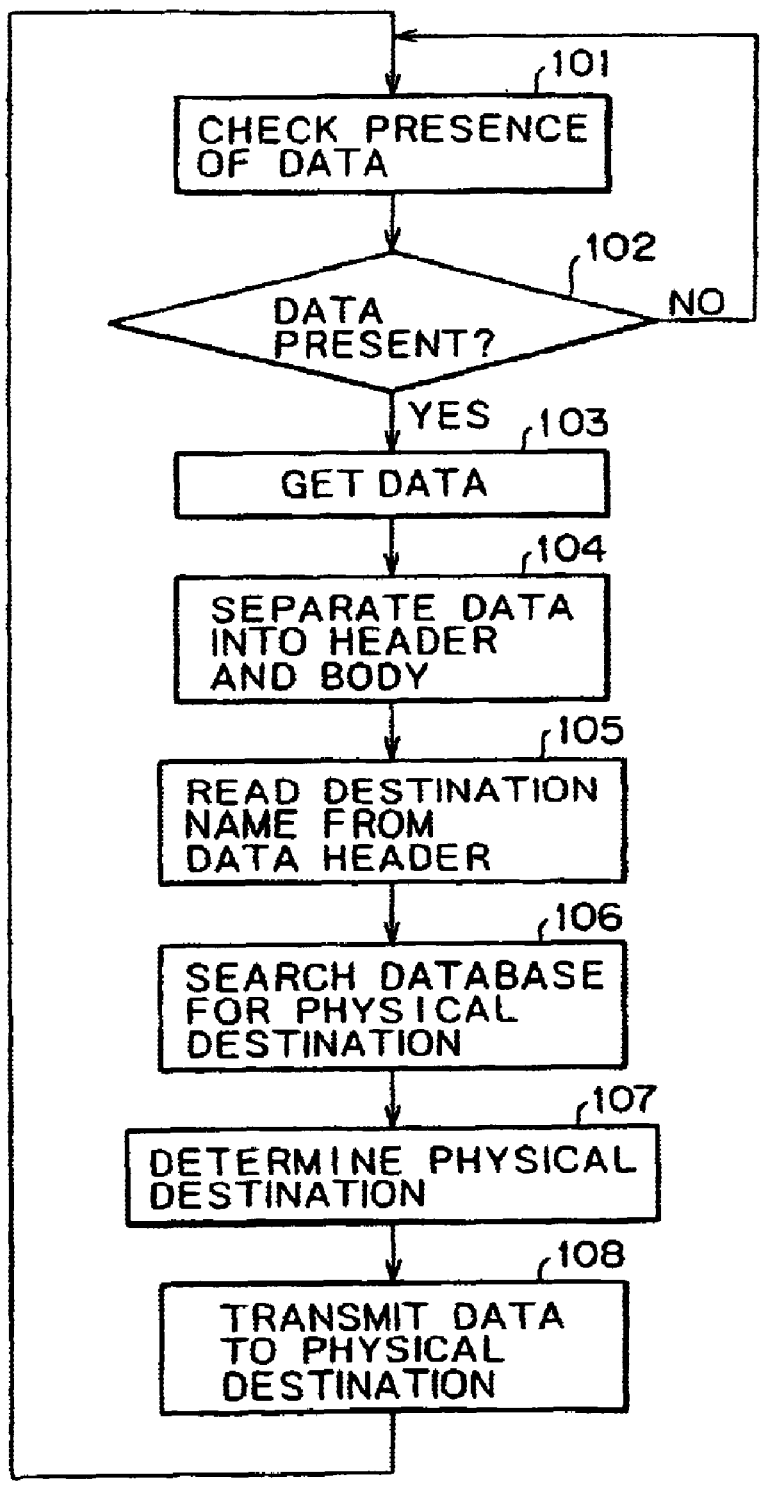
FIG. 6 is a flowchart of steps in which the embodiment of the present invention typically operates.

How the broker 20 illustratively operates is described below with reference to the flowchart of FIG. 6.

In step 101, the broker 20 checks the presence of data to be mediated at a data entry. In step 102, a check is made to see if the data exist. If no data are found, step 101 is reached again and the arrival of data is awaited.

When data to be mediated are found at the data entry, step 102 is followed by step 103 in which the data are read into a storage area. In step 104, the data are separated into a header and a body.

In step 105, a data destination is read from the data header. In step 106, the database is searched using the destination name as the key. When the destination is found, step 107 is reached in which a physical data exit name is determined. In step 108, the data are output to the physical data exit for transmission to the ultimate destination. When more data are subsequently provided, step 101 and the ensuring steps are repeated.

Figure 8:
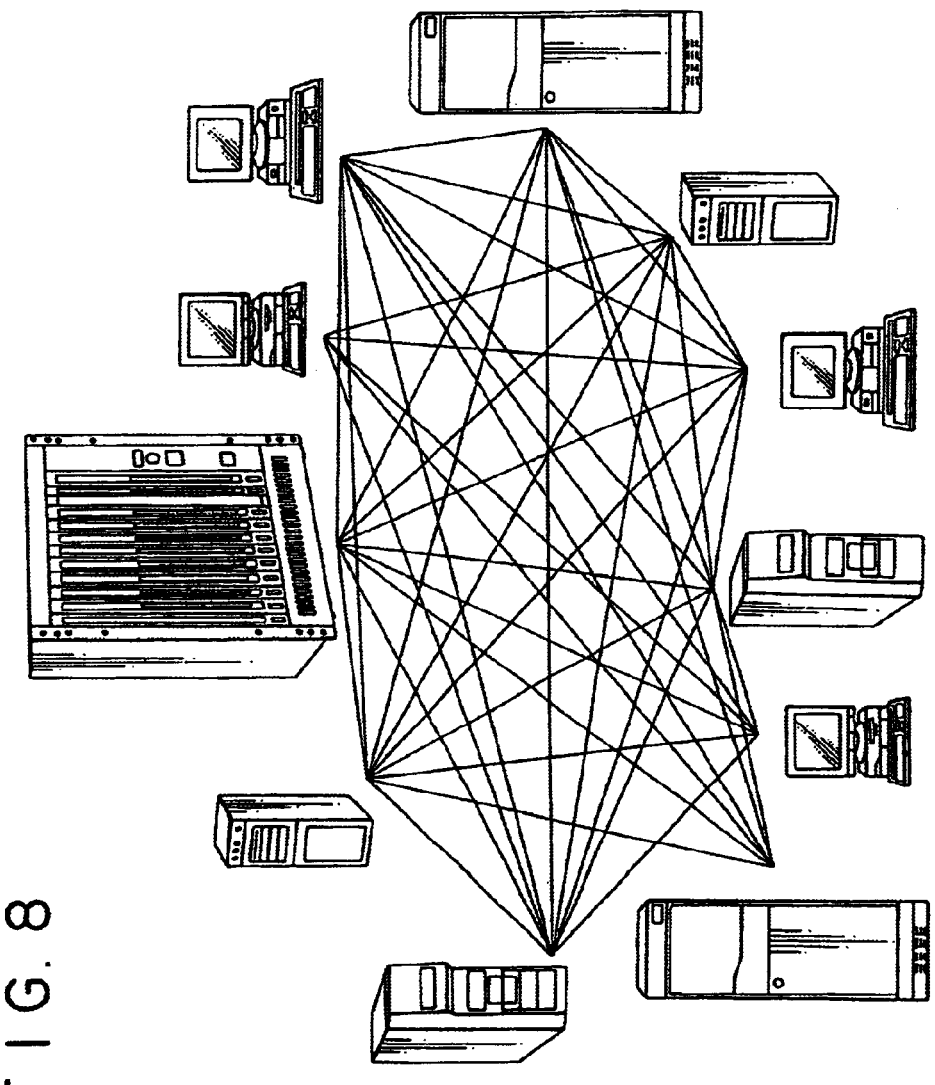
FIG. 8 is another schematic view for explaining the present invention.

As described, the data transfer system of FIG. 1 allows any two of "n" application systems 10 to be connected. In that case, the number of connections to be managed is only "n," a significant reduction can be achieved in managing steps compared with a conventional system configuration of FIG. 8 wherein as many as nC2 connections need to be managed. The larger the number (n) of application systems 10 configured, the more appreciable the number of management steps eliminated.

It follows that where numerous application systems 10 are configured aggressively to build a newly integrated system, any increase in the number of steps for carrying out maintenance and other management-related activities is reduced.

Figure 7:
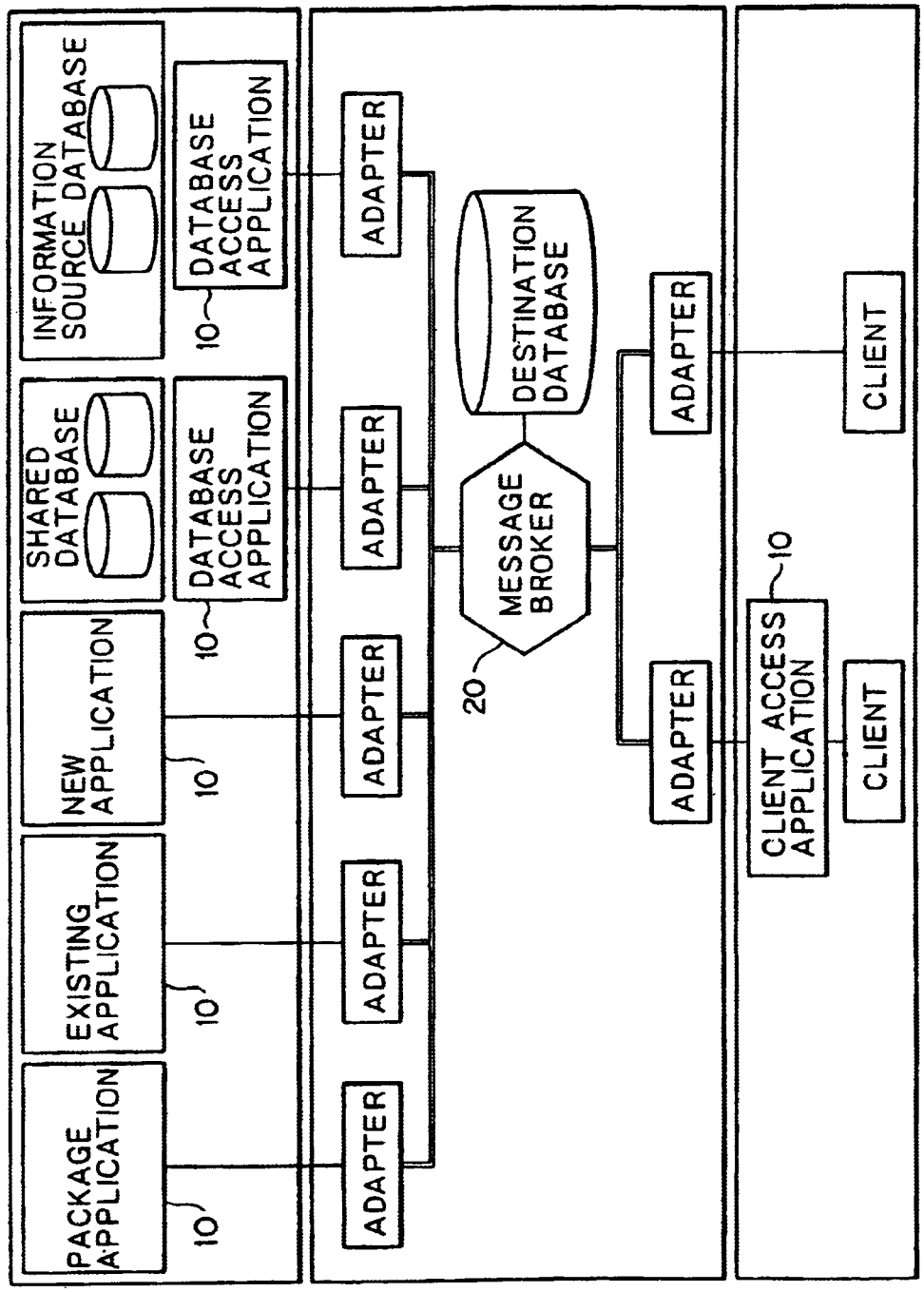
FIG. 7 is a schematic flow diagram of another embodiment of the present invention.

FIG. 7 is a schematic flow diagram of another embodiment of the invention, showing connective relations between a broker 20 and various systems 10 and including programs called adapters for assisting such connections. In that setup, the broker 20 has a database that retains destination names for the purpose of mediating data to be transferred.

The setup above may comprise additional functions: a logging function for keeping logs related to the mediation of data to be transferred; a data backup function for data backup in preparation for possible troubles in the broker 20 or in the application systems 10; an error handling function for error recovery in the event of, say, destination names missing; and a response function for responding to such requests as a status query from any of the application systems 10.

As described, the inventive system drastically reduces the number of steps necessary for management activities when any two of a plurality of application systems are to be connected.

As many apparently different embodiments of this invention may be made without departing from the spirit and scope thereof, it is to be understood that the invention is not limited to the specific embodiments thereof except as defined in the appended claims.

What is claimed is:

1. A mediating system centrally located among "n" application systems respectively operated within an operation operating environment and being configured to support data transfers among the application systems, comprising:

one data entry connected to each of said "n" application systems;

"n" data exits connected respectively to said respective "n" application systems;

a transmission function group linked to said one data entry and to said "n" data exits for receiving data originated from one of said "n" application systems and for transmitting the data received through said data entry to a destination application system among said "n" application systems; and a transmission path determination function group for selectively determining said destination application system among said "n" application systems in accordance with a destination name attached to the data received through said data entry.

2. The mediating system of claim 1, further comprising:

a database for storing destination names; and adaptor means inserted between each of said "n" application systems for supporting connection between the mediating system and the destination application system.

3. A mediating system centrally located among a plurality of application systems, the mediating system configured to support data transfers among the application systems, comprising:

a data entry connected to each application system;

a plurality of data exits, each data exit connected to a corresponding application system;

a transmission function group linked to said data entry connected to a first application system and to at least one of said data exits connected to a second application system for receiving data originating from said first application system and for transmitting the data received through said data entry to the second application system; and a transmission path determination function group for selectively determining said second application system among said plurality of application systems in accordance with a destination name attached to the data received through said data entry.

4. The mediating system of claim 3, further comprising:

a database for storing destination names; and an adaptor situated between each of said application systems, wherein each of said adaptor supports connection between the mediating system and the second application system.

* * * * *